April 5, 1949.   L. J. FOWLER   2,466,405
TAPE HOOK
Filed July 28, 1945
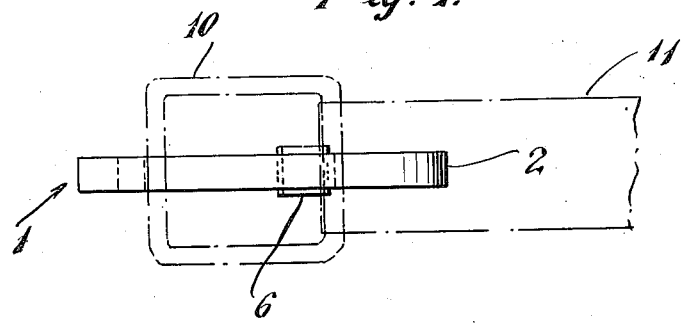
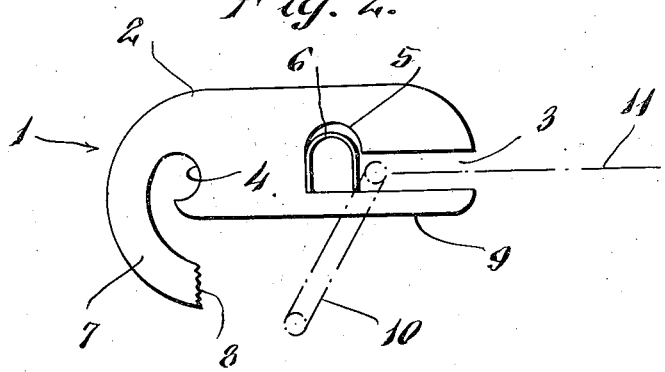 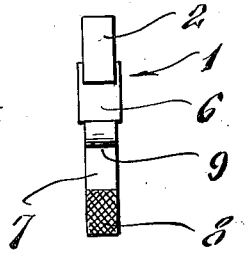
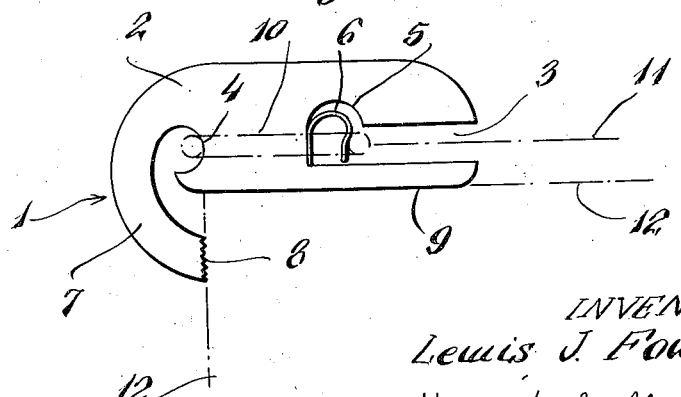
INVENTOR
Lewis J. Fowler
BY Henry R. R. Metzler
Agt.

Patented Apr. 5, 1949

2,466,405

UNITED STATES PATENT OFFICE 2,466,405

TAPE HOOK

Lewis J. Fowler, Dumont, N. J.

Application July 28, 1945, Serial No. 607,586

1 Claim. (Cl. 33—137)

The present invention relates to new and useful improvements in tape lines and similar measuring devices, and it relates more specifically to a new and improved tapeline hook.

A measuring tape or a tape line is a tape or strip of steel or the like marked with linear dimensions and having a ring at one end. When measuring large objects it has been necessary that either one person holds the ring at the end of the tape line at a starting point while another person leads the tape along said large object and carries out the measuring operation; or it has been necessary to attach said ring to the starting point of the intended measuring by means of a nail or the like, so that one person alone could carry out the measuring work. Both methods mentioned are bothersome and require comparatively much time.

Therefore, the main object of the present invention is the provision of a device of the character described which allows one person to attach easily, simply and safely one end of a tape line to a starting point, so that he then can walk along the object to be measured and can carry out the measuring operation without the use of an assistant and without damaging walls or furniture or the like by driving nails into them.

Another object of the present invention is the provision of a device of the character described which is primarily flat, light in weight, and of a very small size so that it can be carried conveniently in a purse or pocket.

Still another object of the present invention is the provision of a device of the character described which has no movable parts that may be subject to wear and tear, so that it will never cause any inaccurate measurements, and which is simple in construction so that it can be manufactured and sold at a very reasonable price.

Further objects of the instant invention reside in any novel feature of construction or operation or novel combination of parts present in the embodiment of the invention described and shown in the accompanying drawing whether within or without the scope of the appended claim and irrespective of other specific statements as to the scope of the invention contained herein.

In the drawing:

Figure 1 is a top elevation of a preferred embodiment of my invention;

Figure 2 is a side elevation showing the device as it appears when it is not in use;

Figure 3 is a rear elevation; and

Figure 4 is a side elevation showing the device in use.

Similar numerals refer to similar parts throughout the several views.

In the drawing the numeral 1 denotes a preferably flat oval-shaped body of metal, plastic material or the like, which has two substantially parallel longitudinal sides. Its front portion 2 is provided with a curved hook portion 7 which projects over the lower longitudinal side 9 and whose inner side communicates with a curved opening 4. The extremity 8 of portion 7 is provided with a roughage and is in vertical alignment with the innermost portion of the opening 4. The end portion of body 1 which is opposite to portion 2 is provided with an open slot 3 whose parallel horizontal sides are parallel to the outer longitudinal side 9 of body 1. The upper side of the slot 3 communicates with a recess 5 whose upper portion is preferably semi-circular, as may be seen in Figs. 2 and 4. A spring 6, which consists preferably of an inverted U-shaped piece of steel or the like, is tack-welded or detachably inserted into the recess 5 and is kept in place by its own resiliency which tends to expand its flanges.

The ring 10, which is a well known part of an ordinary tape line 11, is inserted into the slot 3 and the opening 4 as indicated in dash-and-dotted lines in Figs. 2 and 4, and is safely held in place by the action of spring 6. Then the hook 7 is laid on the edge of an object to be measured, for instance on a box 12 or the like, so that the roughage 8 engages that side of the object from which the measuring is to start. Once this is done, the person who carries out the measuring operation can do so (alone) just as if somebody would hold the ring 10 or if the ring 10 were nailed upon the object 12. The device can be used advantageously for horizontal as well as for vertical measurement and also for diagonal or oblique measurements.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claim.

Having thus described my invention, what I claim and desire to secure by Letters Patent in the United States is:

A tape line hook comprising an oval-shaped body which is rectangular in cross-section having substantially parallel longitudinal sides and being provided at one end with a curved hook portion which projects over one of said parallel sides and with a curved opening which communicates with the inner side of said hook portion, and also having at its other end an open slot whose outer portion is parallel to said longitudinal sides and whose upper rear portion is curved upwardly so as to form a half-circular recess communicating with said outer slot portion, and an inverted U-shaped flat spring inserted into said half-circular recess, the outer extremity of said hook portion being provided with a roughage and being in alignment with that portion of said curved communicating opening which is closest to said half-circular recess, all substantially as described.

LEWIS J. FOWLER.

REFERENCES CITED

The following references are of record in the file of this patent:

UNITED STATES PATENTS

| Number | Name | Date |
|---|---|---|
| 1,542,990 | Tomasso | June 23, 1925 |
| 1,631,682 | Hoffstetter | June 7, 1927 |